(12) United States Patent
Ramirez

(10) Patent No.: US 8,219,223 B1
(45) Date of Patent: Jul. 10, 2012

(54) EDITING AUDIO ASSETS

(75) Inventor: Daniel Ramirez, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1089 days.

(21) Appl. No.: 11/756,586

(22) Filed: May 31, 2007

(51) Int. Cl.
*G06F 17/00* (2006.01)
(52) U.S. Cl. .......................................... 700/94; 381/119
(58) Field of Classification Search ...................... 700/94
See application file for complete search history.

(56) References Cited

U.S. PATENT DOCUMENTS

| | | | |
|---|---|---|---|
| 5,228,093 A * | 7/1993 | Agnello | 381/119 |
| 2004/0008852 A1 * | 1/2004 | Also et al. | 381/119 |
| 2008/0255687 A1 * | 10/2008 | Eppolito | 700/94 |

* cited by examiner

*Primary Examiner* — Davetta W Goins
*Assistant Examiner* — Joseph Saunders, Jr.
(74) *Attorney, Agent, or Firm* — Fish & Richardson P.C.

(57) ABSTRACT

Systems, methods, and computer program products for editing digital audio data are provided. In some implementations a method is provided. The method includes receiving digital audio data incorporated in a plurality of audio tracks and receiving a selection of one or more audio tracks of the plurality of audio tracks for editing, the selected audio tracks being fewer than all of the plurality of audio tracks. The method also includes receiving an input specifying an audio effect to apply to the selected audio tracks and applying an inverse of the audio effect to one or more non-selected audio tracks in response to the input.

24 Claims, 17 Drawing Sheets

EDITING AUDIO ASSETS

BACKGROUND

The present disclosure relates to editing digital audio data.

Digital audio data can include audio data in different digital audio tracks. Tracks are typically distinct audio files. Tracks can be generated mechanically (e.g., using a microphone), synthesized (e.g., using a digital synthesizer), or generated as a combination of any number of individual tracks. Tracks can include audio data representing individual instruments (e.g., kick drum, bass guitar, vocals) or combinations of individual instruments (e.g., an entire drumset). A track includes one or more channels (e.g., a stereo track can include two channels, left and right). A channel is a stream of audio samples. For example, a channel can be generated by converting an analog input from a microphone into digital samples using a digital analog converter.

Tracks can be mixed to form one or more group tracks. For example, a number of individual drum tracks can be summed to form a group drum track. A final mixed track summing all individual tracks can be generated. This mixed track is typically referred to as a mixdown or master track. The mixdown is typically stored as a two channel audio file. However, the mixdown track can include any number of channels depending on the particular application.

The audio data for a track can be displayed in various digital representations. For example, an amplitude display shows a representation of audio intensity in the time-domain (e.g., a graphical display with time on the x-axis and amplitude on the y-axis). Similarly, a frequency spectrogram shows a representation of frequencies of the audio data in the time-domain (e.g., a graphical display with time on the x-axis and frequency on the y-axis). Tracks can be played and analyzed alone or in combination with other tracks. Additionally, the audio data of one or more tracks can be edited. For example, the digital audio data can be adjusted by a user to increase amplitude of the audio data for a particular track (e.g., by increasing the overall intensity of the audio data) across time. In another example, the amplitude of audio data can be adjusted over a specified frequency range. This is typically referred to as equalization.

Audio data at a particular frequency can obscure a user's ability to hear other audio data at a similar frequency, particularly when the other audio data has a lower amplitude. For example, a kick drum and a bass guitar can share similar frequency ranges. When both are played back simultaneously, the instrument having lower amplitude can be masked in that frequency range by the other instrument.

SUMMARY

Systems, methods, and computer program products for editing digital audio data are provided. In general, in one aspect, a computer-implemented method is provided. The method includes receiving digital audio data incorporated in a plurality of audio tracks and receiving a selection of one or more audio tracks of the plurality of audio tracks for editing, the selected audio tracks being fewer than all of the plurality of audio tracks. The method also includes receiving an input specifying an audio effect to apply to the selected audio tracks and applying an inverse of the audio effect to one or more non-selected audio tracks in response to the input.

Other embodiments of this aspect include corresponding systems, apparatus, computer program products, and computer readable media.

Implementations of the aspect can include one or more of the following features. The input specifying an audio effect can further include receiving an input selecting one or more frequencies of the audio track. The selected audio effect can be an amplitude increase to be applied to the selected one or more frequencies and applying the inverse of the audio effect can include applying a corresponding amplitude decrease to the selected one or more frequencies of each non-selected audio track, where the corresponding amplitude decrease is a multiplier of the amplitude increase.

The aspect can further include applying the audio effect to the selected audio tracks. The selected audio effect can be an amplitude increase and applying the inverse of the audio effect included applying a corresponding amplitude decrease to each non-selected audio track. The aspect can further include identifying a time range for the identified audio effect. The aspect can further include identifying one or more of the audio tracks as protected tracks, where the inverse of the audio effect is not applied to protected tracks. The inverse of the audio effect can be an equal and opposite magnitude of the identified audio effect. The inverse of the audio effect has a magnitude that is a multiplier of the identified audio effect.

In general, in another aspect, a computer-implemented method is provided. The method includes receiving digital audio data incorporated in a plurality of audio tracks and receiving a selection of an audio track of the plurality of audio tracks for editing. The method also includes identifying audio data of the selected audio track applying an inverse of the identified audio data to one or more non-selected tracks of the plurality of tracks.

Other embodiments of this aspect include corresponding systems, apparatus, computer program products, and computer readable media.

Implementations of the aspect can include one or more of the following features. Identifying audio data of the selected audio track can include identifying a spectral print of the audio data. Applying the inverse of the identified audio data can include applying an inverse of the identified spectral print.

Particular embodiments of the subject matter described in this specification can be implemented to realize one or more of the following advantages. Particular audio data of a selected track can be emphasized over competing audio data in other tracks by modifying the non-selected tracks. An inverse audio effect can be automatically applied to audio data in one or more non-selected tracks in response to receiving an input to edit a selected track. The application of an inverse audio effect can provide a greater improvement in audio quality compared to applying the audio effect directly to the selected track. In particular, better audio results can be provided for boosting particular audio data in one track by, for example, attenuating other tracks instead of increasing amplitude of the particular audio data. Additionally, audio effects can quickly be performed across multiple tracks at the same time instead of manually applying effects to each track individually.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
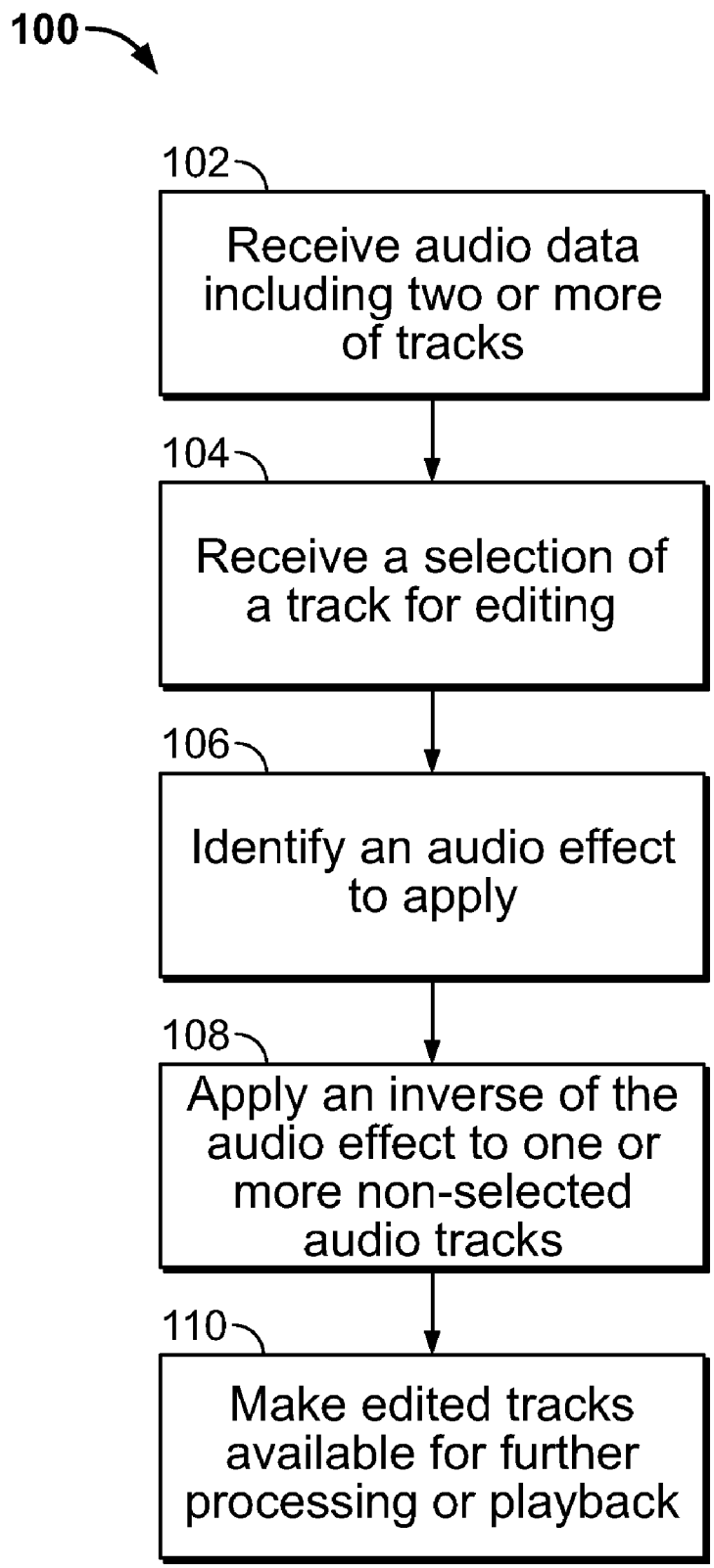
FIG. 1 shows an example method for editing audio assets.

FIG. 1 shows an example method 100 for editing audio assets. For convenience, the method 100 will be described with reference to a system that performs the method 100. The system receives 102 audio data incorporated in two or more tracks. The system can receive the audio data as a number of individual audio files where each audio file includes audio data for a particular track. The audio data can be received in response to a user input to the system selecting particular audio data to edit or for some other purpose. In some implementations, the system receives the audio data from a storage device local or remote to the system. Each of the two or more tracks can include audio data corresponding to particular audio sources, for example, particular instruments, vocals, or other audio sources.

The system receives 104 a selection of a track for editing. For example, a user input can be received using an audio editing interface. The audio editing interface can provide a visual representation of audio data for multiple tracks. The user input can be a manual selection of a particular track to apply an editing operation to. The selected track can be chosen by a user, for example, in order to apply an editing operation. The editing operation can be applied so that the selected track has more prominence when mixed with the other tracks (e.g., to amplify the audio data of the selected track).

The system identifies 106 an audio effect to apply. The audio effect can be one or more editing operations to be performed on the audio data. In some implementations, the audio effect is an editing operation selected by a user to be performed on the selected track. For example, the audio effect can be a change in amplitude to apply to the audio data (i.e., a gain effect). For example, a user input can be received to increase the amplitude of the selected track by five decibels. Alternatively, the audio effect can be applied to a portion of the selected track, e.g., according to time, frequency, or amplitude. For example, the audio effect can be an equalization effect identified for a range of one or more frequencies of the audio data in the selected track (e.g., at 1,000 Hz). Other audio effects can include, for example, pitch shifting. For example, the audio effect can be a shift in the pitch of the selected track up one octave.

The system applies 108 an inverse of the audio effect to one or more non-selected audio tracks. The inverse audio effect is generally an applied audio effect of equal magnitude but in an opposite direction as the identified audio effect. For example, if the identified audio effect is an increase in amplitude in the selected track, the inverse effect is a corresponding decrease in amplitude in non-selected tracks. Similarly, if the amplitude increase is limited, for example to a particular range of frequencies, the amplitude decrease is applied to the corresponding frequencies of the non-selected tracks. In another example, if the identified audio effect is a shift of the pitch in the selected track up one octave, the inverse effect is a corresponding shift in pitch in the non-selected tracks (e.g., down one octave).

In some implementations, different scaling can be applied to the inverse audio effect. For example, the inverse audio effect can be a multiplier of the identified audio effect so that the magnitude of the effect is diminished or magnified for each individual non-selected track.

The inverse audio effect can be automatically applied without user interaction. Alternatively, the inverse audio effect can be applied according to user specified parameters (e.g., to particular tracks, with a particular scaling).

In some implementations, one or more of the non-selected tracks are designated as protected tracks. The inverse audio effect is not applied to the protected tracks. In some implementations, the selected track is unchanged. Alternatively, the selected audio effect can be applied to the selected track, increasing the overall audio effect across all tracks (e.g., further emphasizing the audio data in the selected track).

As a consequence of applying the inverse audio effect to audio data of other tracks, the audio data of the selected track is enhanced. For example, two different audio tracks can include audio data at the same frequency (e.g., corresponding to a kick drum and a bass guitar, respectively). In order to enhance the audio data of the first track over the audio data of the second track at the same frequency, the gain is decreased for the second track while the gain is increased or unchanged in the first track. Thus, in the above example, the kick drum audio data can be emphasized over the competing bass guitar audio data.

Figure 2:
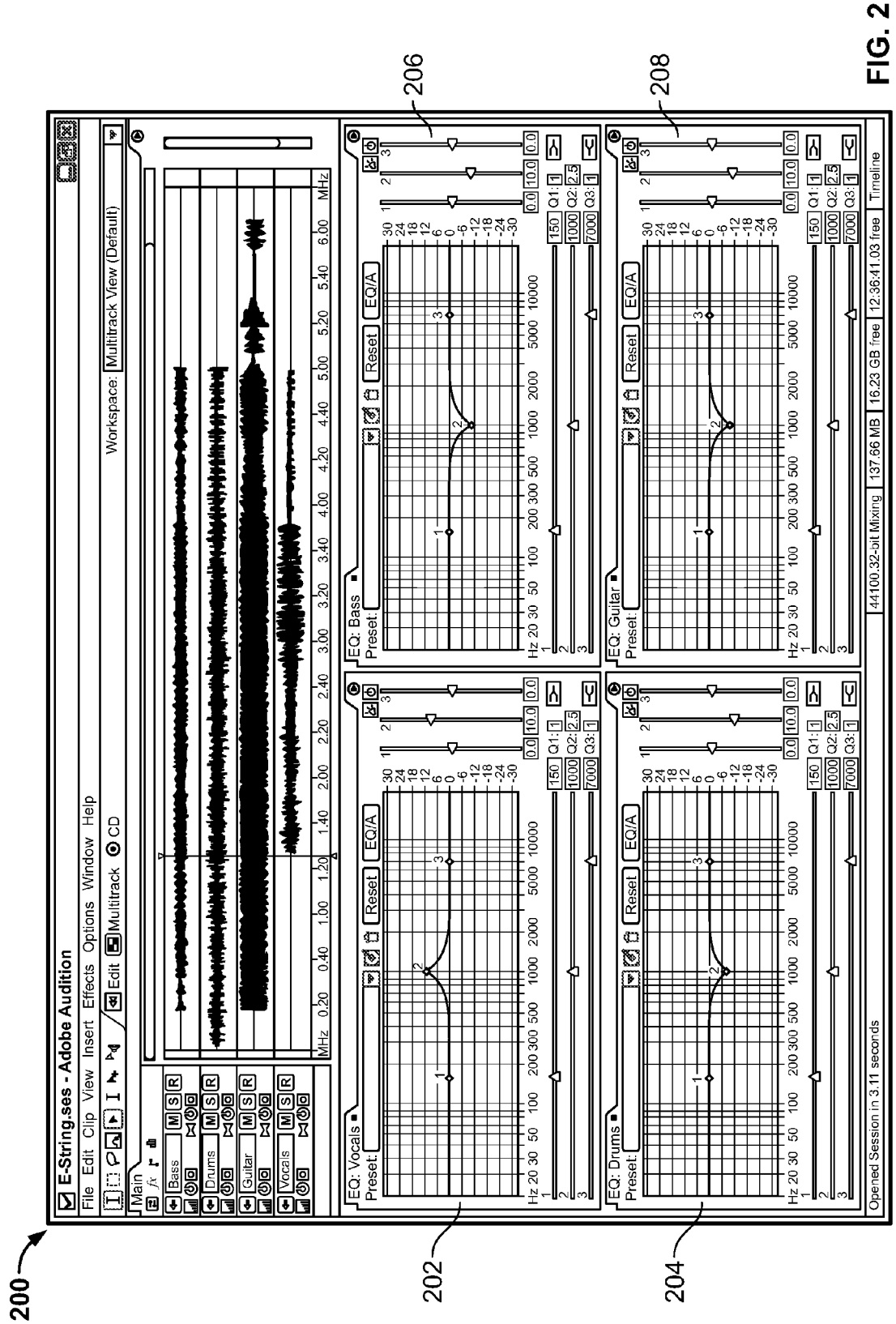
FIG. 2 shows an example display of multiple tracks where an inverse gain has been applied.

FIG. 2 shows an example display 200 of multiple tracks where an inverse gain has been applied. In FIG. 2, four tracks are shown. A visual representation of each track is provided that represents the audio data of that track. In particular, track 202 shows audio data corresponding to a vocal source, track 204 shows audio data corresponding to a drum source, track 206 shows audio data corresponding to a bass source, and track 208 shows audio data corresponding to a guitar source. The visual representation of each track shows the audio data with respect to frequency on one axis and amplitude on a second axis.

In particular, track 202 is the selected track. The identified audio effect is an increase in amplitude of the audio data centered at 1000 Hz by a specified number of decibels. Thus, the identified audio effect is intended to enhance the vocal source at 1000 Hz. Track 202 shows a bump in the amplitude of the audio data for track 202 centered at 1000 Hz corresponding to the specified amplitude increase. The amplitude increase centered at 1000 Hz is applied to all audio data in the track 202 across time.

The remaining tracks 204, 206, and 208 are non-selected tracks. The inverse of the identified audio effect is applied to each of the tracks. For example, track 204, representing the drum source, shows a dip in amplitude centered at 1000 Hz corresponding to the increase in amplitude of the track 202. For example, if the track 204 was increased by 6 dB, the track 204 has a corresponding decrease in amplitude of 6 dB. Alternatively, the corresponding decrease can be a function of the increase (e.g., a multiplier). Tracks 206 and 208 show similar dips in amplitude centered at 1000 Hz. The inverse effect applied to tracks 204, 206, and 208 is applied to all audio data in the tracks centered at 1000 Hz. Consequently, audio data at 1000 Hz in track 202 has been emphasized with respect to audio data at the same frequency of the other tacks.

As shown in FIG. 1, the system makes 110 edited tracks available for further processing or playback. For example, the edited tracks can be mixed to form a single mixdown track. The mixdown track can then be played, stored, and edited.

Figure 3:
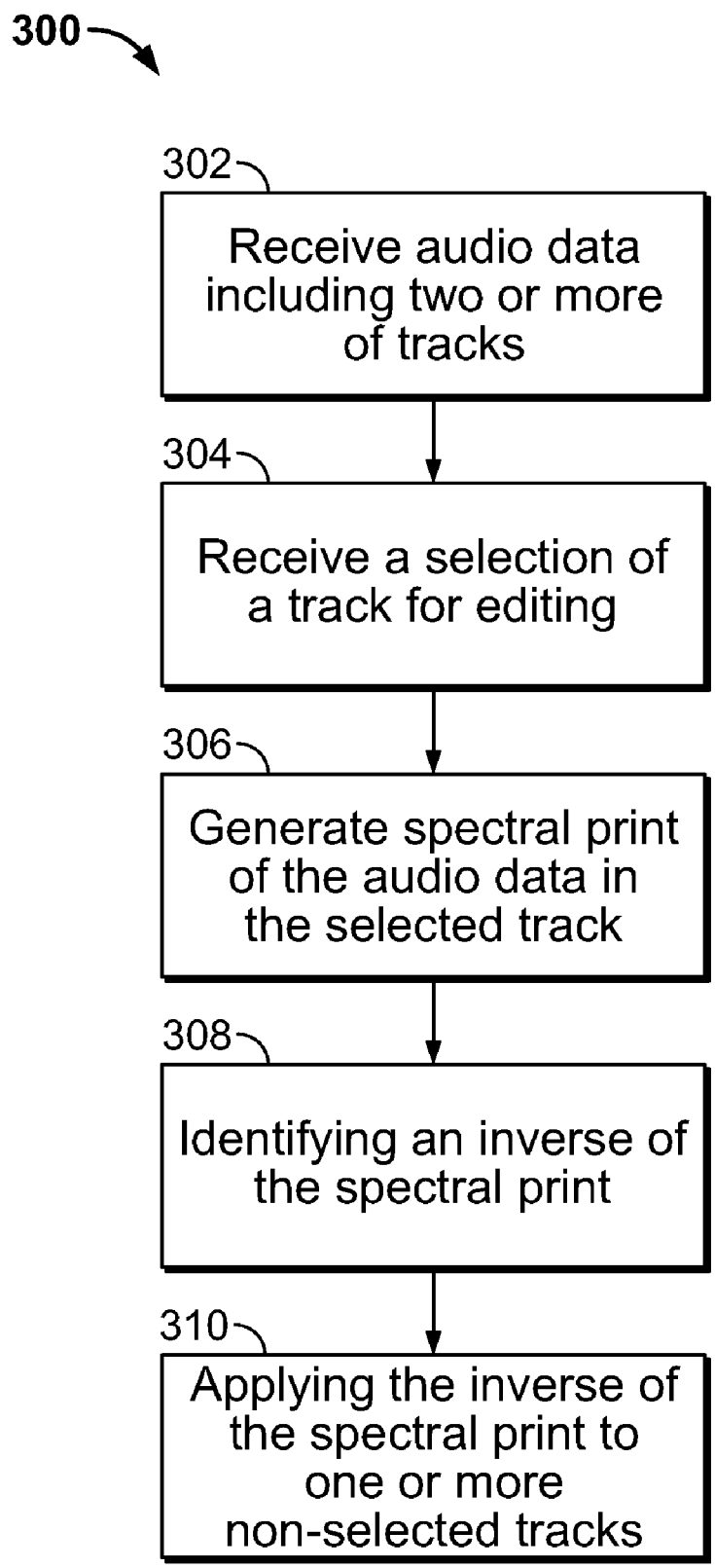
FIG. 3 shows an example method for editing audio assets using a spectral print.

FIG. 3 shows an example method 300 for editing audio assets using a spectral print. A spectral print can be illustrated by a visual representation of audio data as a function of amplitude and frequency at a particular time. Thus, the spectral print is slice of the audio data at that time. For convenience, the method 300 will be described with reference to a system that performs the method 300. The system receives 302 audio data incorporated in two or more tracks. Each of the two or more tracks can include audio data corresponding to particular audio sources, for example, particular instruments, vocals, or other audio sources.

The system receives 304 a selection of a track. For example, a user input can be received using an audio editing interface. The user input can be a manual selection of a particular track to apply an editing operation to. The selected track can be chosen by a user, for example, in order to apply an editing operation so that the selected track has more prominence when mixed with the other tracks.

The system generates 306 one or more spectral prints of the audio data in the selected track. The audio data of the track is analyzed, for example, to identify the frequency and amplitude values for the track at a given time t. A separate spectral print can be generated for multiple instances of time in order to capture the changing audio data across time. The number of spectral prints generated for a track can be user specified. Alternatively, the system can generate a default number of spectral prints. An example of spectral prints across time is shown in FIGS. 10-13.

In some implementations, the system generates a spectral print for a portion of the audio data in the selected track. For example, the system can generate a spectral print for a particular frequency range. The particular frequency range can be selected, for example, to isolate particular frequencies having desirable qualities in the selected track.

Figure 4:
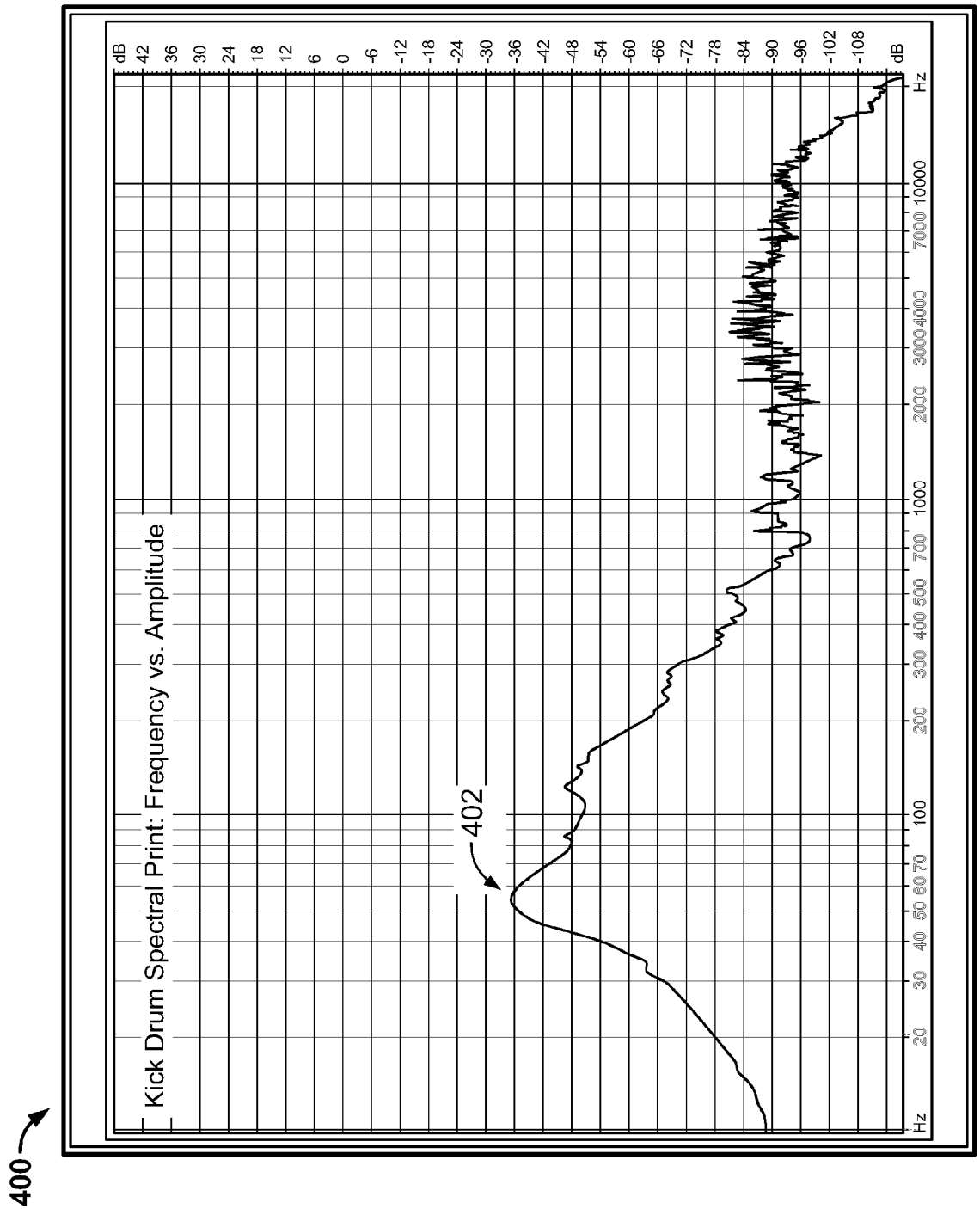
FIG. 4 shows an example spectral print of a first track.

FIG. 4 shows an example spectral print 402 of a first track 400. In the example, the first track 400 represents a kick drum. The spectral print 402 shows a representation of the audio data as a function of frequency and amplitude at a given point in time. The spectral print 402 shows how the amplitude of the audio data varies with frequency. For example, the spectral print shows that the kick drum has a maximum amplitude between 50 and 60 Hz. However, portions of the audio data can be found in the range from zero to over 10,000 Hz.

The system identifies 308 an inverse of the spectral print. The inverse of the spectral print inverts the relationship between amplitude and frequency. Thus, the inverse has the same frequency response, but with an inverted amplitude. As a result, the frequencies of the audio data originally having the highest amplitude now provide the greatest attenuation when the inverse spectral print is applied to another track.

The application of the inverse of the spectral print to a non-selected track can be described as follows, which, for simplicity is described with respect to a single target frequency (e.g., 1000 Hz). The attenuation applied to the non-selected tracks in response to a selected gain increase in the selected track can vary according to scaling factors based on the amplitude of the audio data in the selected track and a maximum and minimum attenuation values. For example, a maximum attenuation can be specified as 10 dB. The minimum attenuation would be 0 dB (i.e., no change). For example, a selected track can have an amplitude value at 1000 Hz of −10 dB and a non-selected track can have a respective amplitude value at 1000 Hz of −6 dB. Note that in digital audio, the maximum amplitude is typically 0 dB and the amplitude scale is negative. Thus, quiet audio data has an amplitude value of −30 dB and lower. The amplitude value where no attenuation occurs can be specified, for example, at −100 dB.

A linear relationship between the amplitude values of the selected track and the maximum and minimum level of attenuation can be derived. For example, if the attenuation is 0 dB at −100 dB, the linear relationship can be written: $X-(X/10)=Y$, where X is equal to the absolute value of the selected track amplitude at the frequency of interest, Y is equal to the amount of attenuation the non-selected track will receive at the frequency of interest, and 10 is the maximum possible attenuation of 10 dB. The final amplitude value in the non-selected track at the frequency of interest when applying the inverse spectral print would be $N-Y=Z$, where N equals the amplitude value of the non-selected track at the frequency of interest, Y is as above, and Z is the final amplitude value of the non-selected track at that frequency.

Therefore, if the selected track's amplitude value is −10 dB at 1000 Hz the application of the inverse print at 1000 Hz would result in an attenuation of 9 dB applied to the non-selected track at 1000 Hz (i.e., 10−(10/10)=9). Since, as stated above, the non-selected track has an amplitude value of −6 dB at 1000 Hz, the resulting amplitude value after applying the inverse spectral print would be −15 dB (i.e., $N-Y=-6-9=-15$ dB).

In some implementations, a log scale can be used in a similar manner instead of a linear one. The log scale would provide greater attenuation closer to 0 dB and less attenuation closer to −100 dB.

Figure 5:
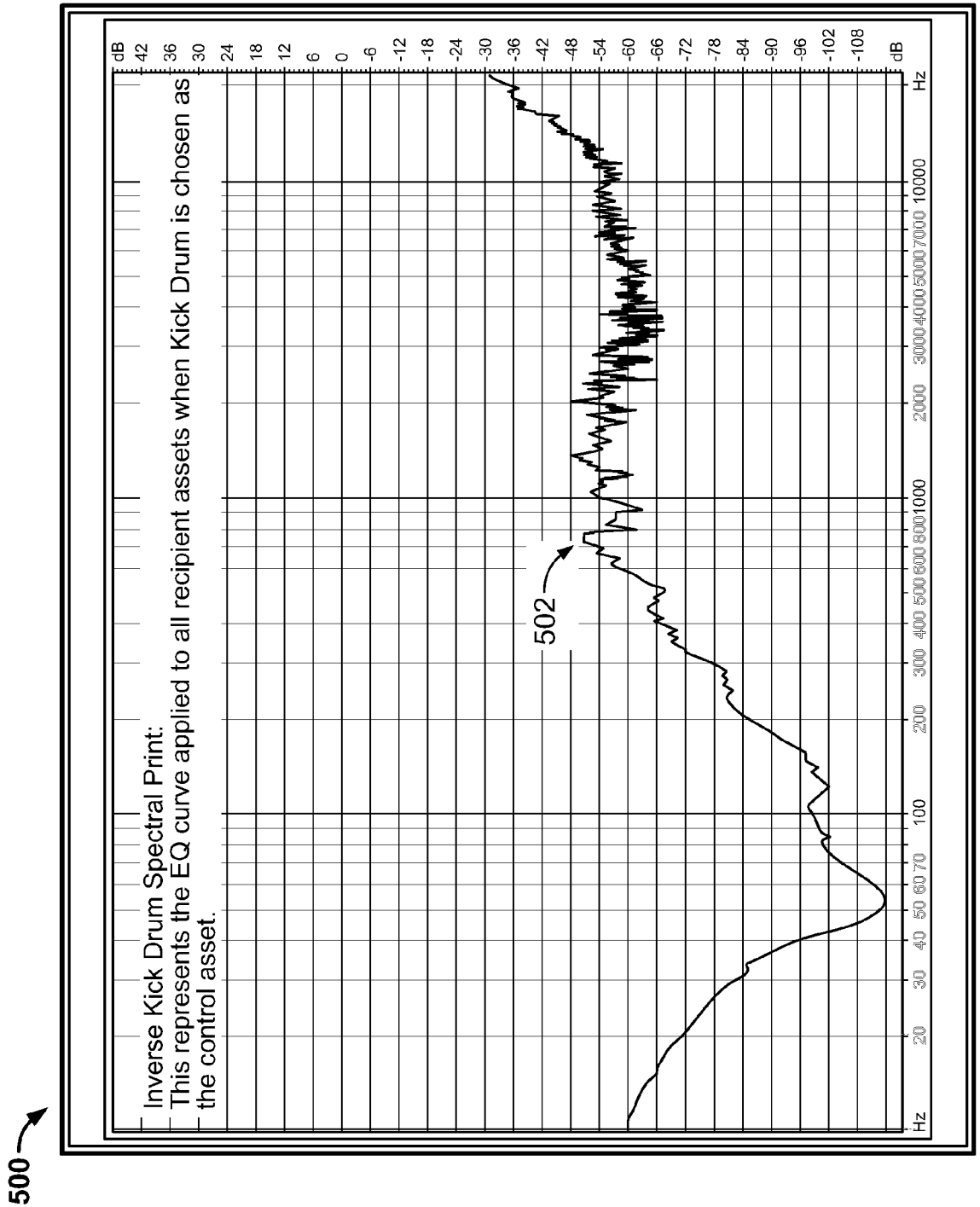
FIG. 5 shows an example spectral print of the inverse of the first track.

FIG. 5 shows an example inverse spectral print 502 of the first track 400. The inverse spectral print 502 provides a specified attenuation derived from the spectral print 402 of FIG. 4.

As shown in FIG. 3, the system applies 310 the inverse spectral print to one or more non-selected tracks. In some implementations, the inverse spectral print is automatically applied to each other track. Alternatively, the inverse spectral print is applied according to user specified parameters (e.g., identifying tracks to apply the inverse spectral print to, identifying a scaling to the inverse spectral print). In other implementations, one or more of the non-selected tracks are identified as protected tracks and the inverse spectral print is automatically applied to other tracks that have not been identified as protected tracks.

The applied inverse spectral print attenuates the corresponding audio data of the non-selected tracks. Thus, for corresponding frequencies of a non-selected track, the amplitude is attenuated by an amount corresponding to the inverse spectral print at that frequency as described above.

Figure 6:
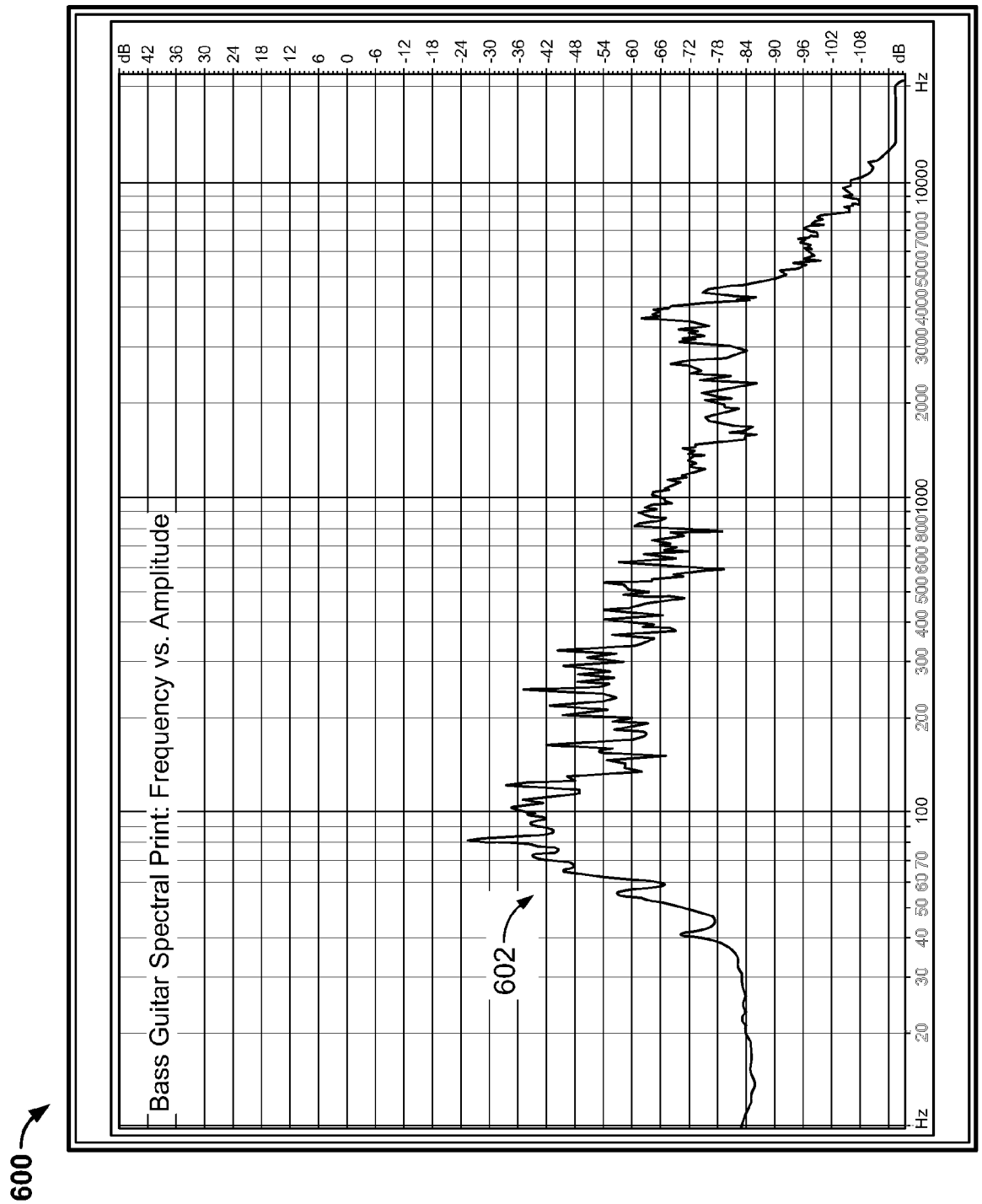
FIG. 6 shows an example spectral print of a second track.

FIG. 6 shows an example spectral print 602 of a second track 600. In the example, the second track 600 represents a bass guitar. The spectral print 602 shows a representation of the audio data as a function of frequency and amplitude at a given point in time. The spectral print 602 shows how the amplitude of the audio data varies with frequency. For example, the spectral print shows that the bass guitar has a greatest amplitude value between 80 Hz and 90 Hz. However, the audio data ranges in frequency from zero to over 10,000 Hz.

Figure 7:
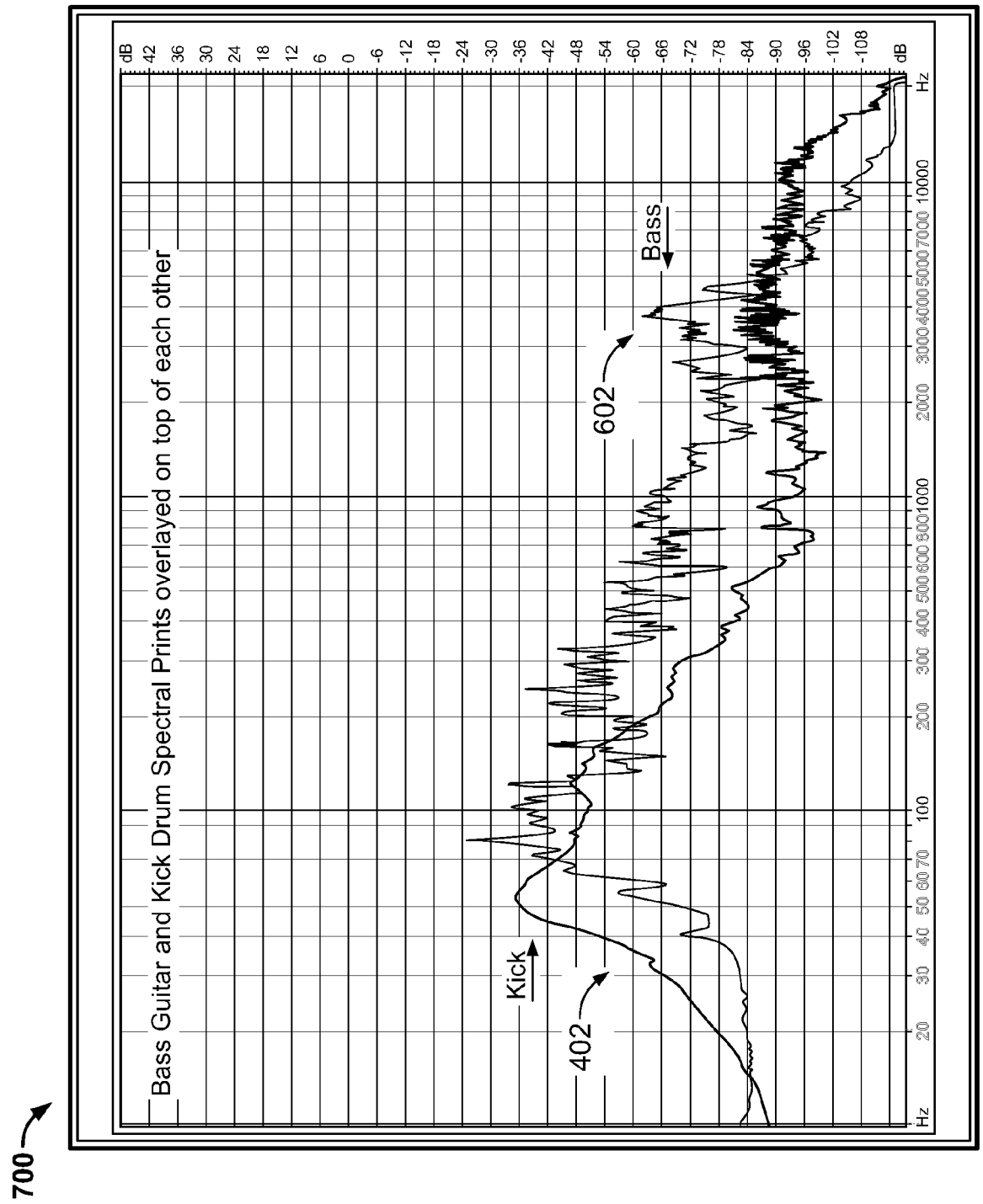
FIG. 7 shows an example display of the spectral print of FIG. 4 with the spectral print of FIG. 6.

FIG. 7 shows an example display 700 of the spectral print 402 of FIG. 4 with the spectral print 602 of FIG. 6. The display 700 shows how the spectral prints relate to each other. For example, in this case the sounds provided by the kick drum and bass guitar compete with one another. By applying the inverse spectral print of the kick drum to the spectral print of the bass guitar, it is possible to emphasis the kick drum audio data over the bass guitar audio data. Additionally, the attenuation of the bass guitar is tailored by frequency to the inverse of the kick drum (e.g., equalization is provided by applying an amplitude reduction for particular frequencies). Thus, the inverse spectral print allows for a different attenuation to be applied for different frequencies. The result provides a similar effect to increasing the amplitude to a selected track across all frequencies, but without resulting in distortion risks e.g., clipping.

In some implementations, the spectral print can be scaled to adjust the magnitude of attenuation applied to the non-selected tracks. For example, the amplitude of the inverse spectral print can be modified by a multiplier across all frequencies. Thus, the amplitude of the inverse spectral print can be reduced (e.g., by a factor of 0.5) or increased (e.g., by a factor of 2) for all frequencies. As a result, the degree of impact on the audio data caused by the inverse spectral print can be controlled. In some implementations, a different scaling of the spectral print can be applied to different tracks.

Figure 8:
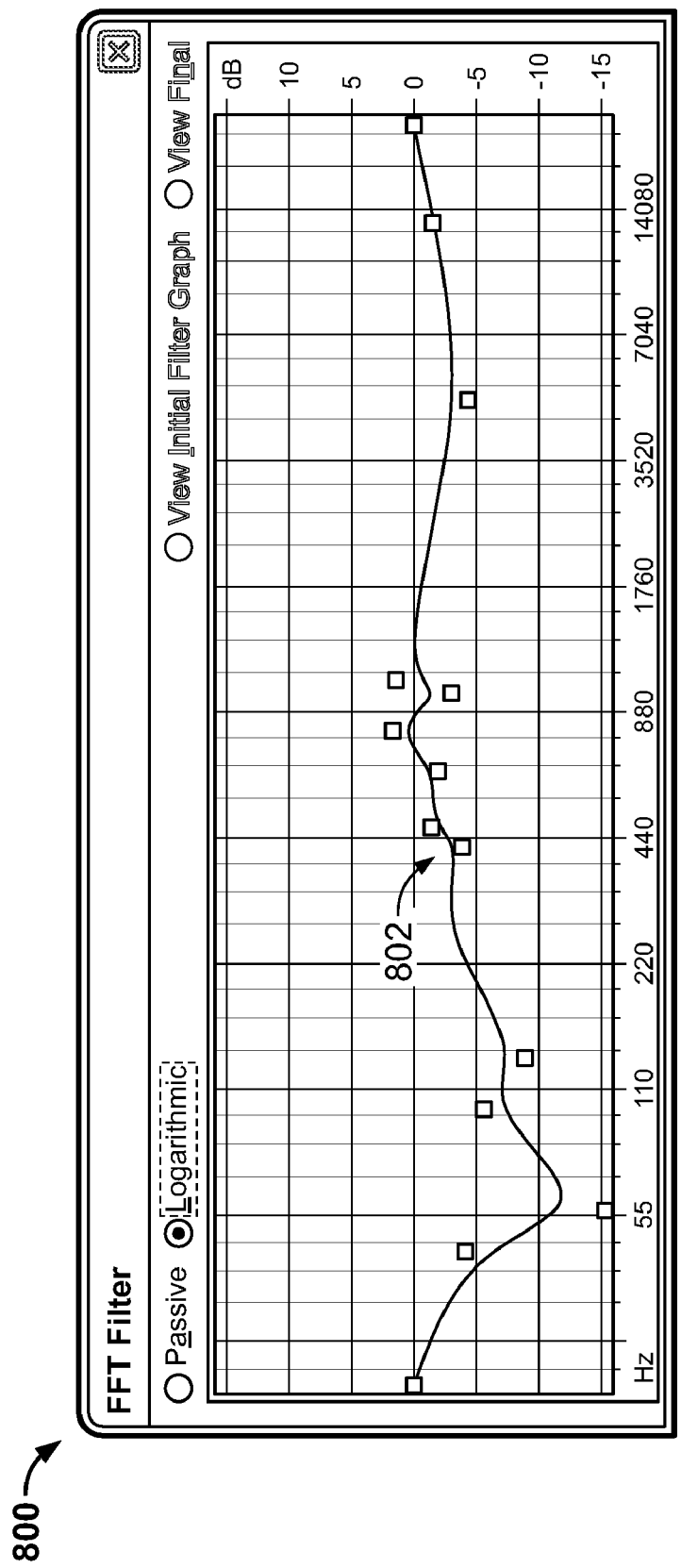
FIG. 8 shows an example display of a fast Fourier transform filter including the inverse spectral print to apply to one or more tracks.

In some implementations, the inverse spectral print is applied to one or more tracks of the audio data using a fast Fourier transform ("FFT") filter. The FFT filter decomposes the audio data corresponding to the inverse spectral print to identify the amplitude values for frequencies of the inverse spectral print. A filter is then applied to the audio data of one or more tracks corresponding to the identified amplitude values. FIG. 8 shows an example FFT filter 800 including the inverse spectral print 802 to apply to one or more tracks.

Figure 9:
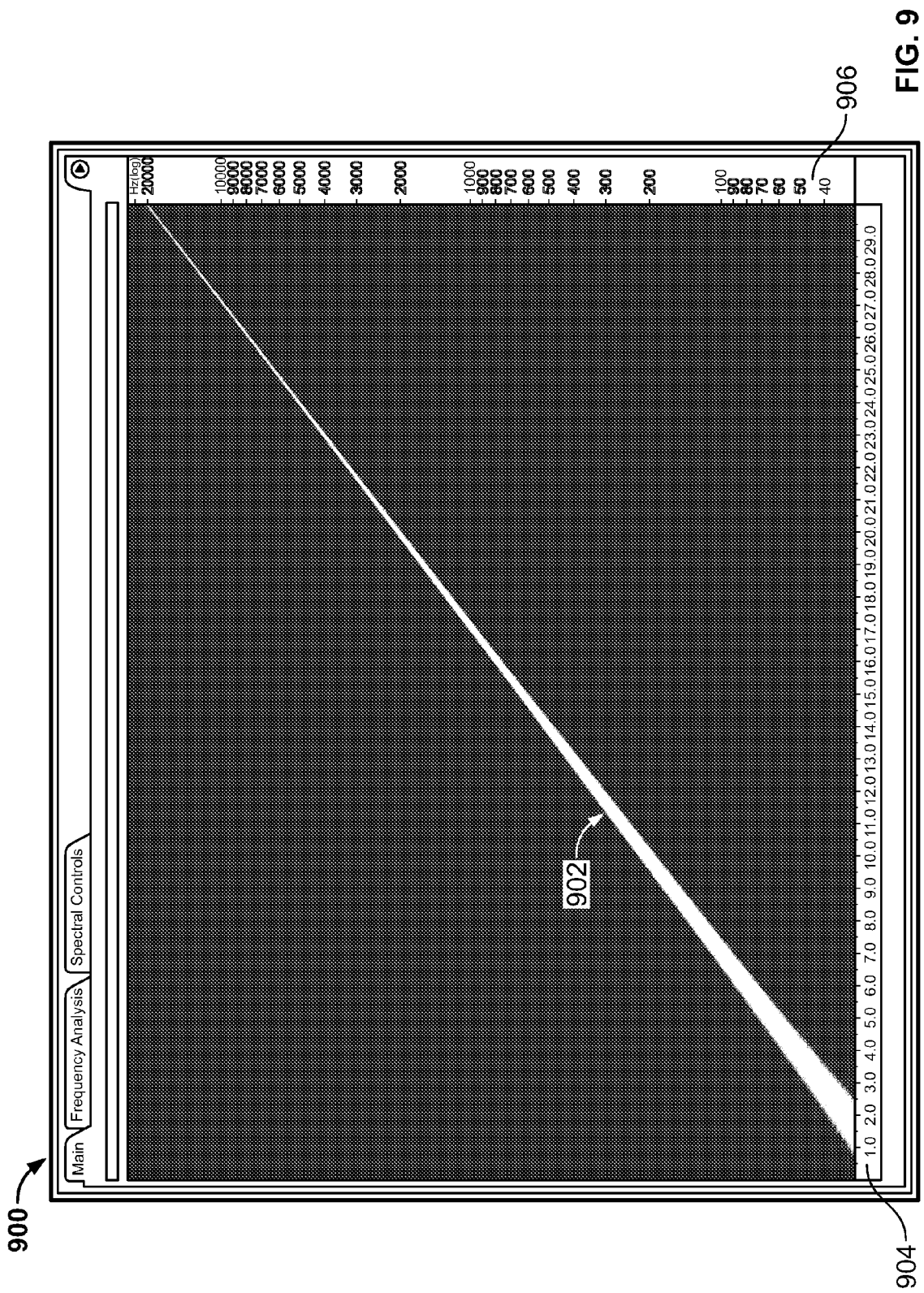
FIG. 9 shows an example display of a sweeping sinusoidal tone.

FIGS. 9-16 show an example application of multiple spectral prints across time. FIG. 9 shows an example display 900 of a sweeping sinusoidal tone 902. The display 900 shows the sweeping sinusoidal tone 902 with respect to a time axis 904 and a frequency axis 906. The sweeping sinusoidal tone 902 sweeps from 20 Hz to 20 kHz over 30 seconds.

A specified number of spectral prints of the sinusoidal tone 902 can be generated. For example, each spectral print can be generated according to a specified time interval (e.g., every five seconds). The smaller the time interval, the more spectral prints. The time interval can be very small to provide a smooth transition between the audio data represented by each spectral print. The inverse of each spectral print can be applied to some other audio data as describe above with respect to FIGS. 3-8 in order to provide an effect across time.

Figure 10:
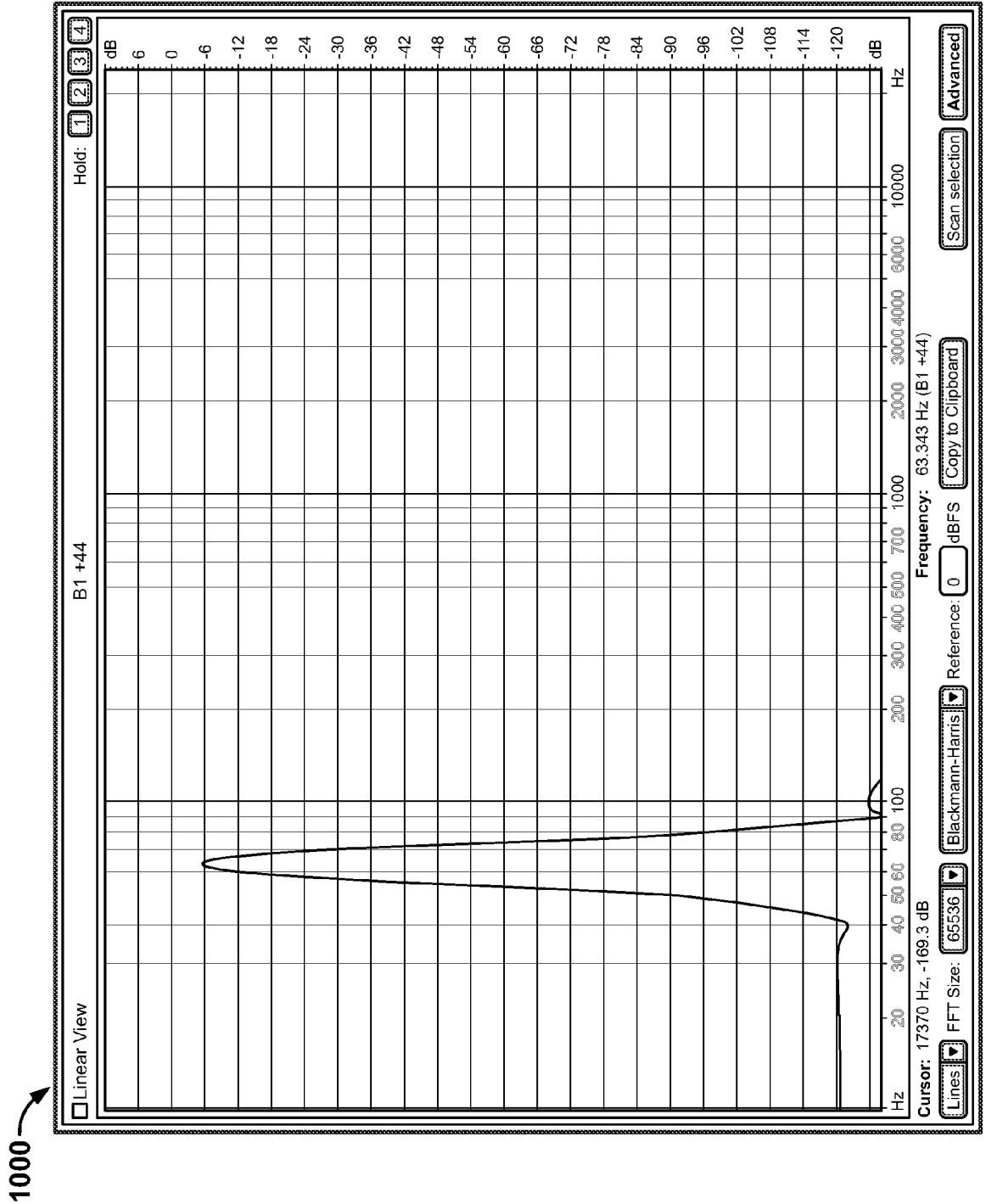
FIG. 10 shows an example spectral display of the sweeping sinusoidal tone of FIG. 9 at time $t_1$.

FIG. 10 shows an example spectral print 1000 of the sweeping sinusoidal tone 902 of FIG. 9 with respect to frequency and amplitude at time $t_1$. In FIG. 10, the spectral print 1000 shows the sweeping sinusoidal tone 902 at time $t_1$=5 seconds. At five seconds, the sinusoidal tone 900 has a peak amplitude between 60 and 70 Hz. As time increases, the spectral prints show the peak amplitude moving to increasing frequencies.

Figure 11:
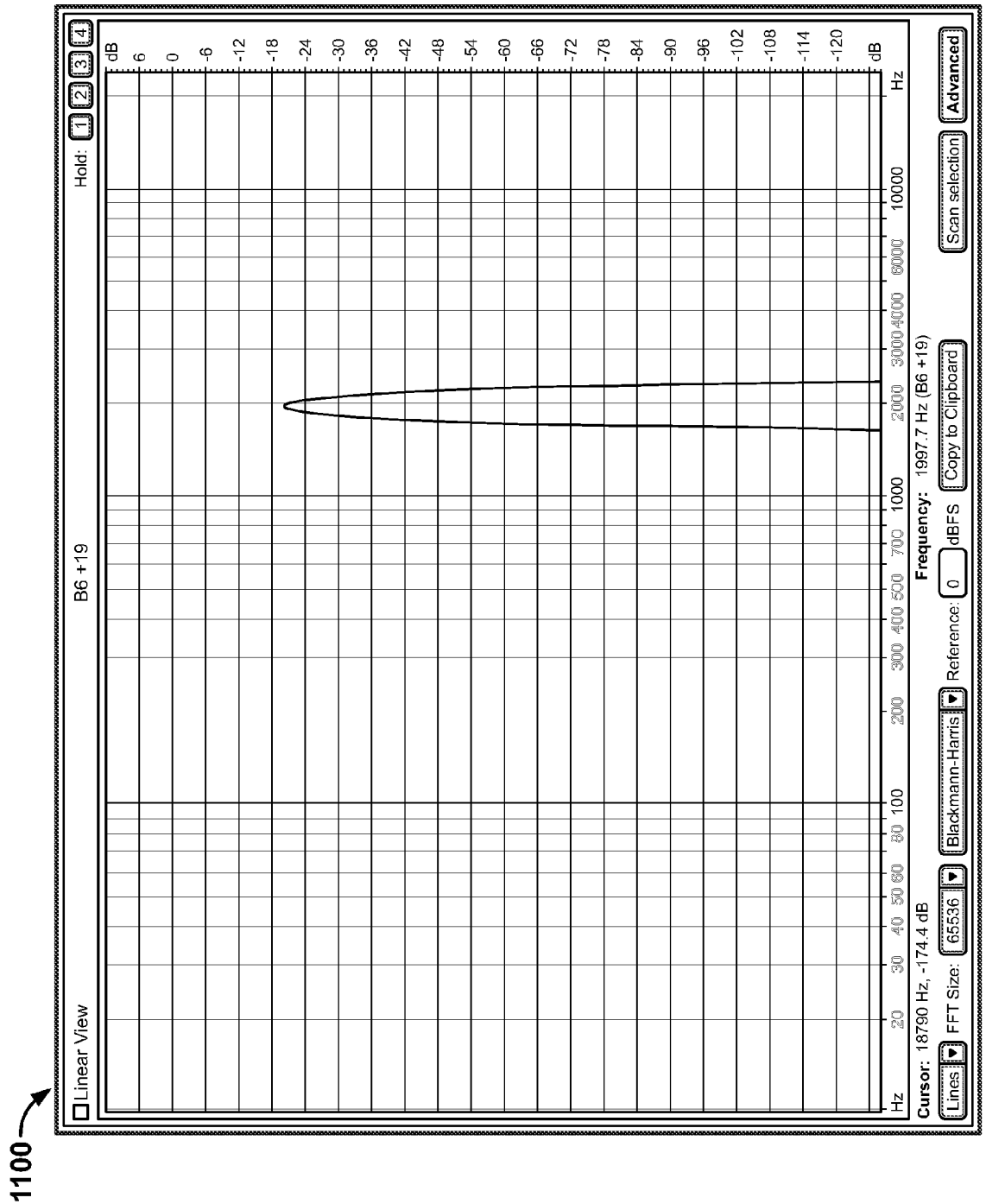
FIG. 11 shows an example spectral display of the sweeping sinusoidal tone of FIG. 9 at time $t_2$.

FIG. 11 shows an example spectral print 1100 of the sweeping sinusoidal tone 902 of FIG. 9 with respect to frequency and amplitude at time $t_2$. In FIG. 11, the spectral print 1100 shows the sweeping sinusoidal tone 902 at time $t_2$=10 seconds. At ten seconds, the sinusoidal tone 900 has a peak amplitude substantially at 2000 Hz.

Figure 12:
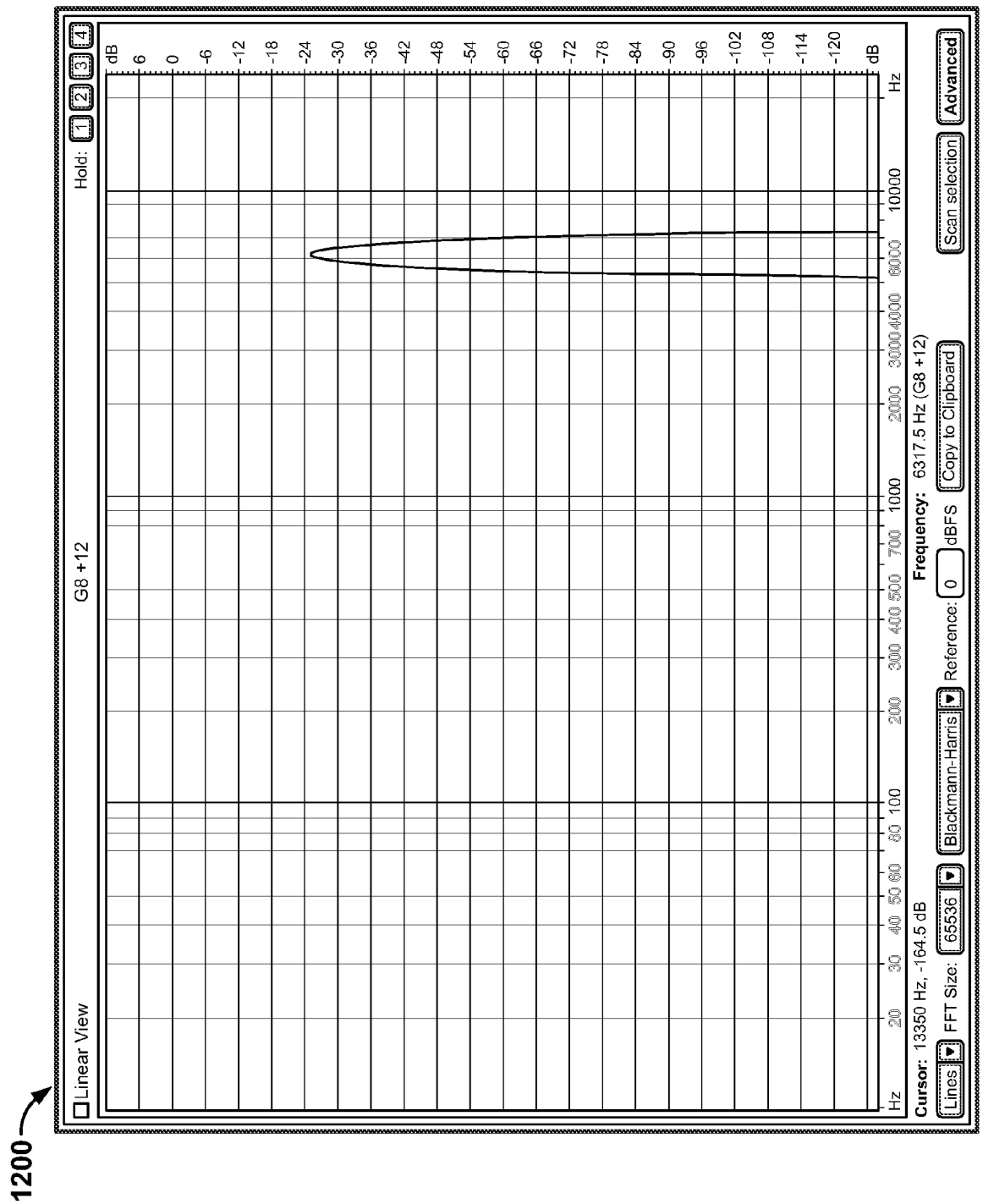
FIG. 12 shows an example spectral display of the sweeping sinusoidal tone of FIG. 9 at time $t_3$.

FIG. 12 shows an example spectral print 1200 of the sweeping sinusoidal tone 902 of FIG. 9 with respect to frequency and amplitude at time $t_3$. In FIG. 12, the spectral print 1200 shows the sweeping sinusoidal tone 902 at time $t_3$=15 seconds. At 15 seconds, the sinusoidal tone 900 has a peak amplitude substantially at 6000 Hz.

Figure 13:
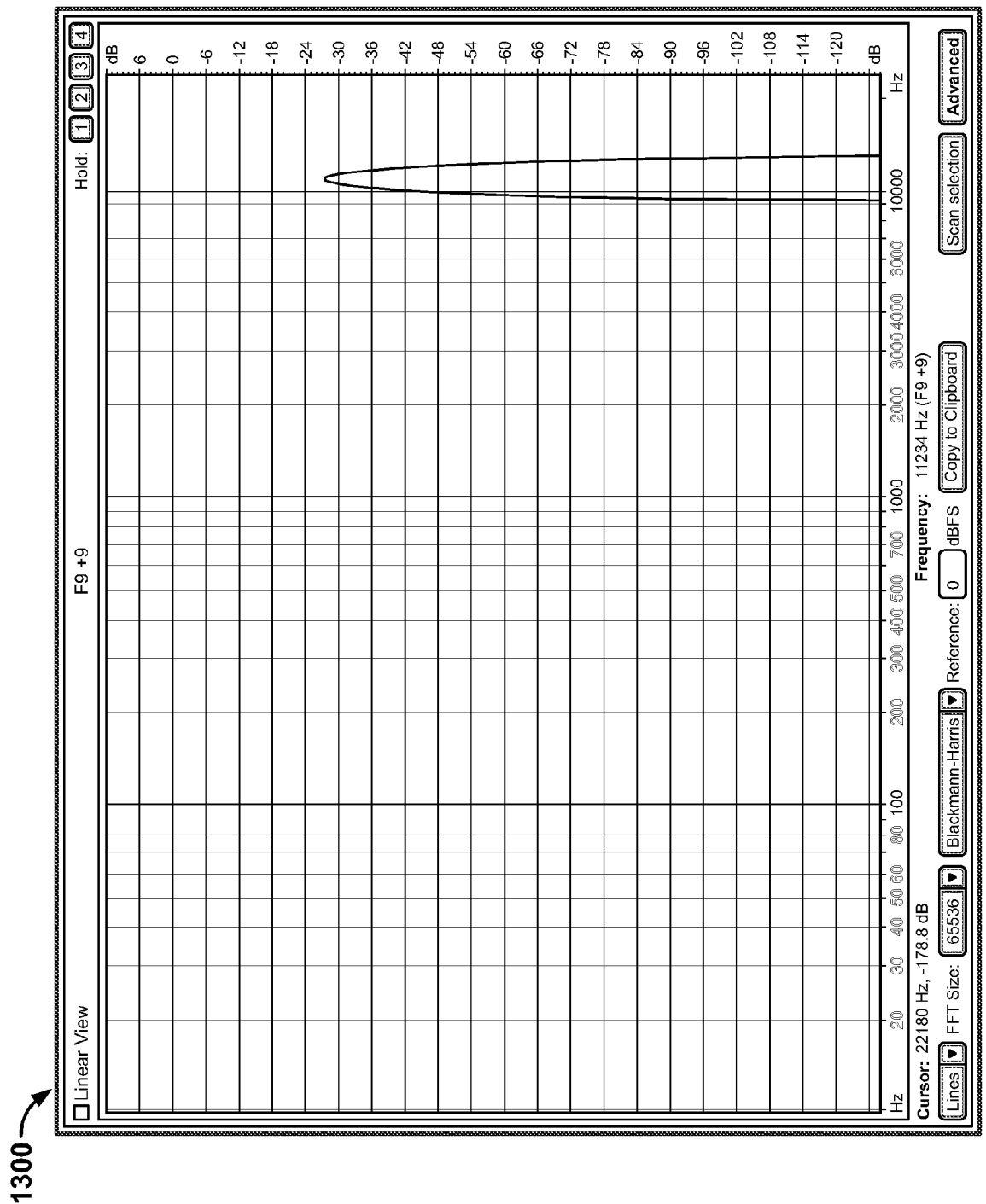
FIG. 13 shows an example spectral display of the sweeping sinusoidal tone of FIG. 9 at time $t_4$.

FIG. 13 shows an example spectral print 1300 of the sweeping sinusoidal tone 902 of FIG. 9 with respect to frequency and amplitude at time $t_4$. In FIG. 13, the spectral print 1300 shows the sweeping sinusoidal tone 902 at time $t_4$=20 seconds. At 20 seconds, the sinusoidal tone 900 has a peak amplitude substantially at 10,000 Hz.

Figure 14:
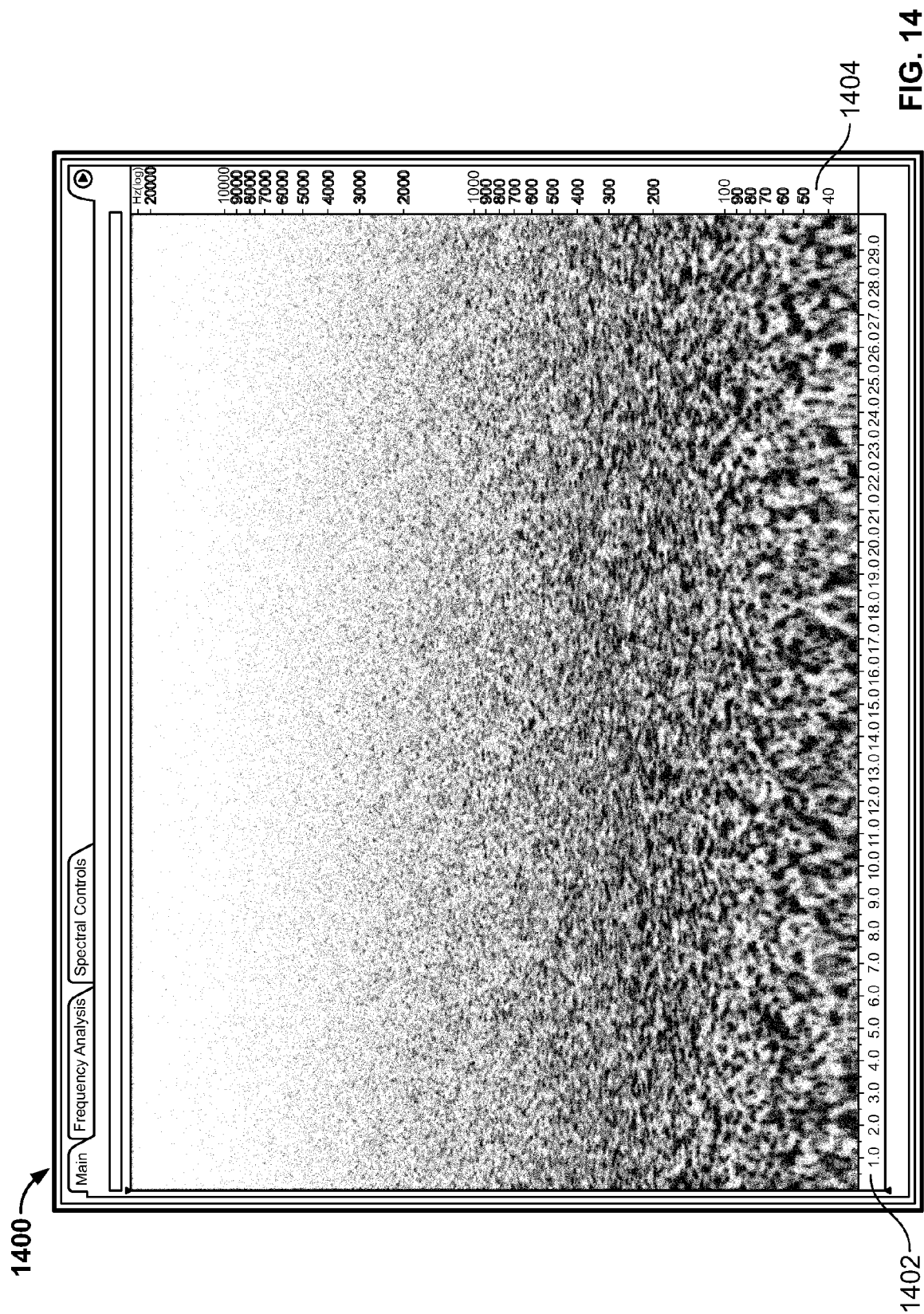
FIG. 14 shows an example display of white noise.

FIG. 14 shows an example display 1400 of white noise. The display 1400 shows audio data with respect to a time axis 1402 and a frequency axis 1404. The display 1400 of white noise shows audio data distributed across a wide band of frequencies across time. The audio data, for example, can have a substantially equal amplitude at each frequency in a specified frequency band (e.g., between 20 Hz and 20 kHz). Thus, the audio data is evenly distributed across the frequency range.

Figure 15:
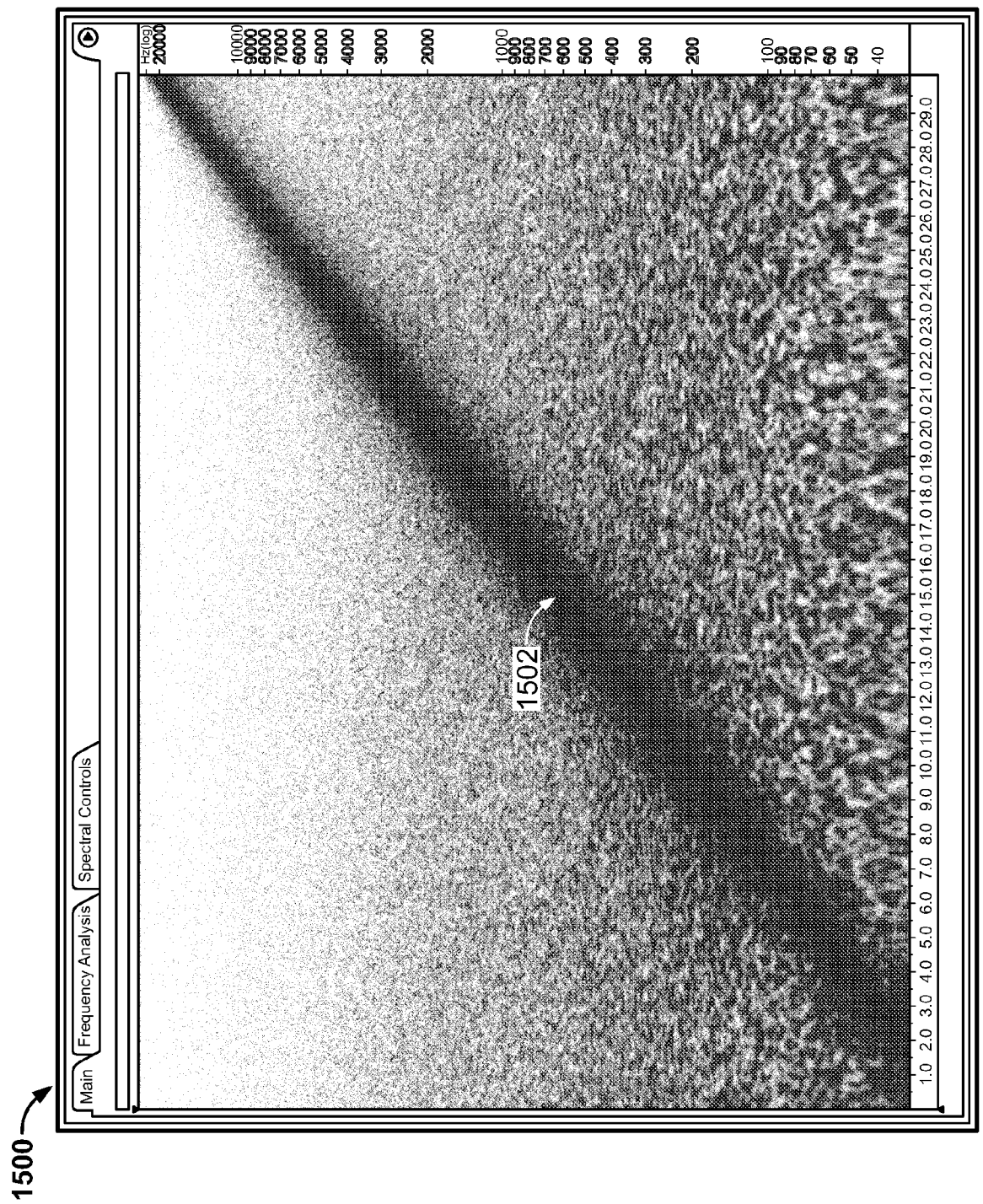
FIG. 15 shows an example display of the white noise displayed in FIG. 14 with an inverse of the sweeping sinusoidal tone of FIG. 9 applied.

FIG. 15 shows an example display 1500 of the white noise displayed in FIG. 14 with an inverse of the sweeping sine tone of FIG. 9 applied. In particular, the inverse of the sweeping sine tone results in a corresponding attenuation of the audio data of the white noise. The result is a reduced amplitude region 1502 of the white noise across time that corresponds to the sweeping sine tone. The application of the inverse sine tone to the white noise can be performed by generating the spectral print of the sweeping sine tone for a number of slices in time and then applying their inverse to the white noise across time.

Figure 16:
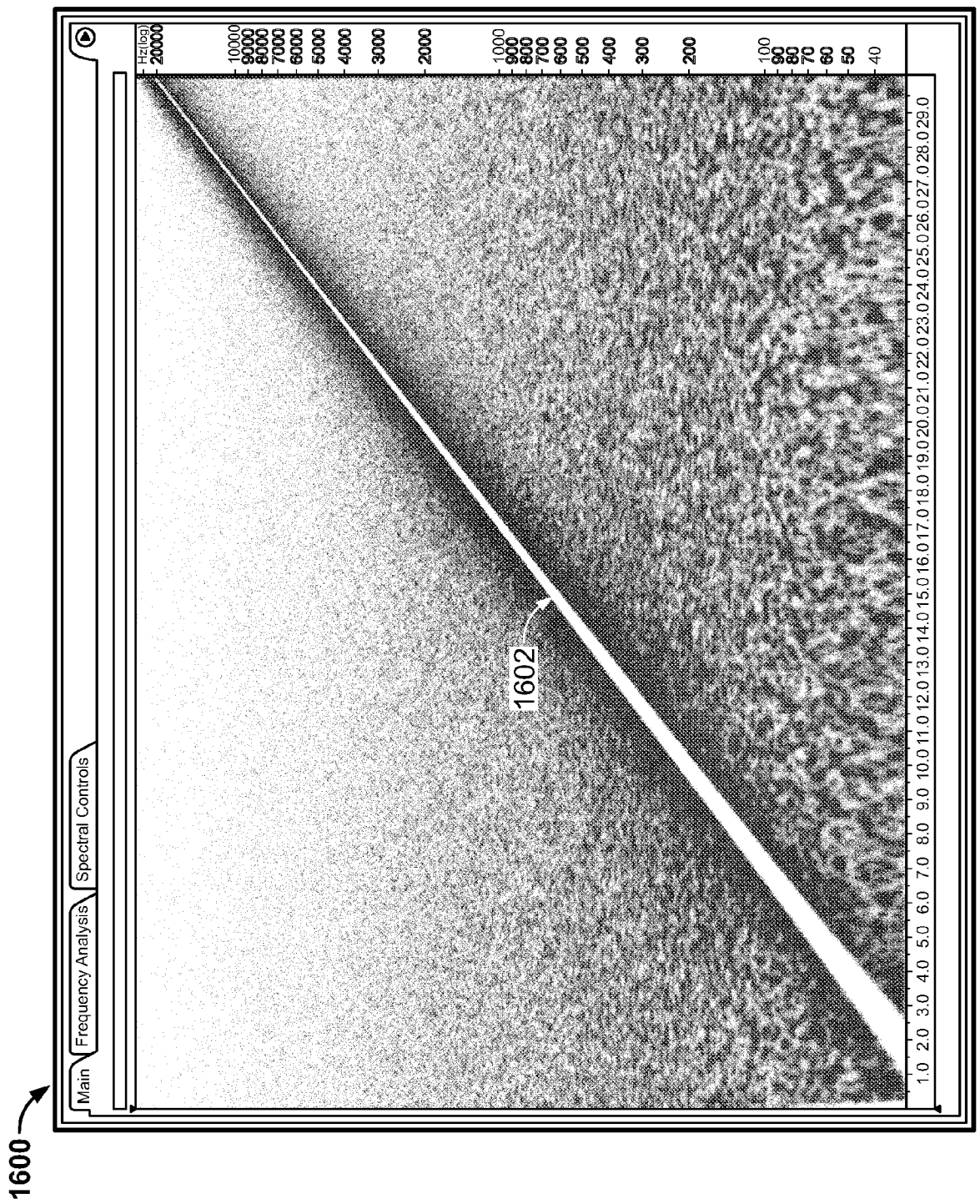
FIG. 16 shows an example display of the sweeping sinusoidal tone of FIG. 9 mixed with the white noise of FIG. 15.

FIG. 16 shows an example display 1600 of the sweeping sinusoidal tone of FIG. 9 mixed with the white noise of FIG. 15. The subtracted region of the white noise shown in FIG. 15 provides a path of reduced amplitude in the white noise, which is then mixed with the sinusoidal tone 1602. The white noise and the sinusoidal tone can be mixed, for example, by adding the audio data. Because of the previous application of the inverse sinusoidal tone to the white noise, the mixed audio data enhances the sinusoidal tone with respect to the white noise because the white noise is not interfering with the sinusoidal tone at those frequencies.

In an analogous and more practical example, the white noise represents a number of mixed audio tracks (e.g., combined audio data for drums, vocals, and rhythm guitar) and the sinusoidal tone represents a particular instrument (e.g., a lead guitar). Consequently, a guitar solo can be emphasized across time even though the frequency of the guitar solo can change with time. For example, the guitar solo can start at the neck of the guitar and ending close to the bridge of the guitar. This results in increasing frequency of the guitar solo over time. Applying the inverse spectral print over time across other tracks creates a void in the other audio data so that the guitar solo is easier to hear in combined audio data (e.g., in the mixdown).

The amount of attenuation to one or more tracks provided by the inverse spectral print at each point in time can be adjusted to provide a higher or lower amount of attenuation relative to the actual amplitude of the inverse spectral print.

Figure 17:
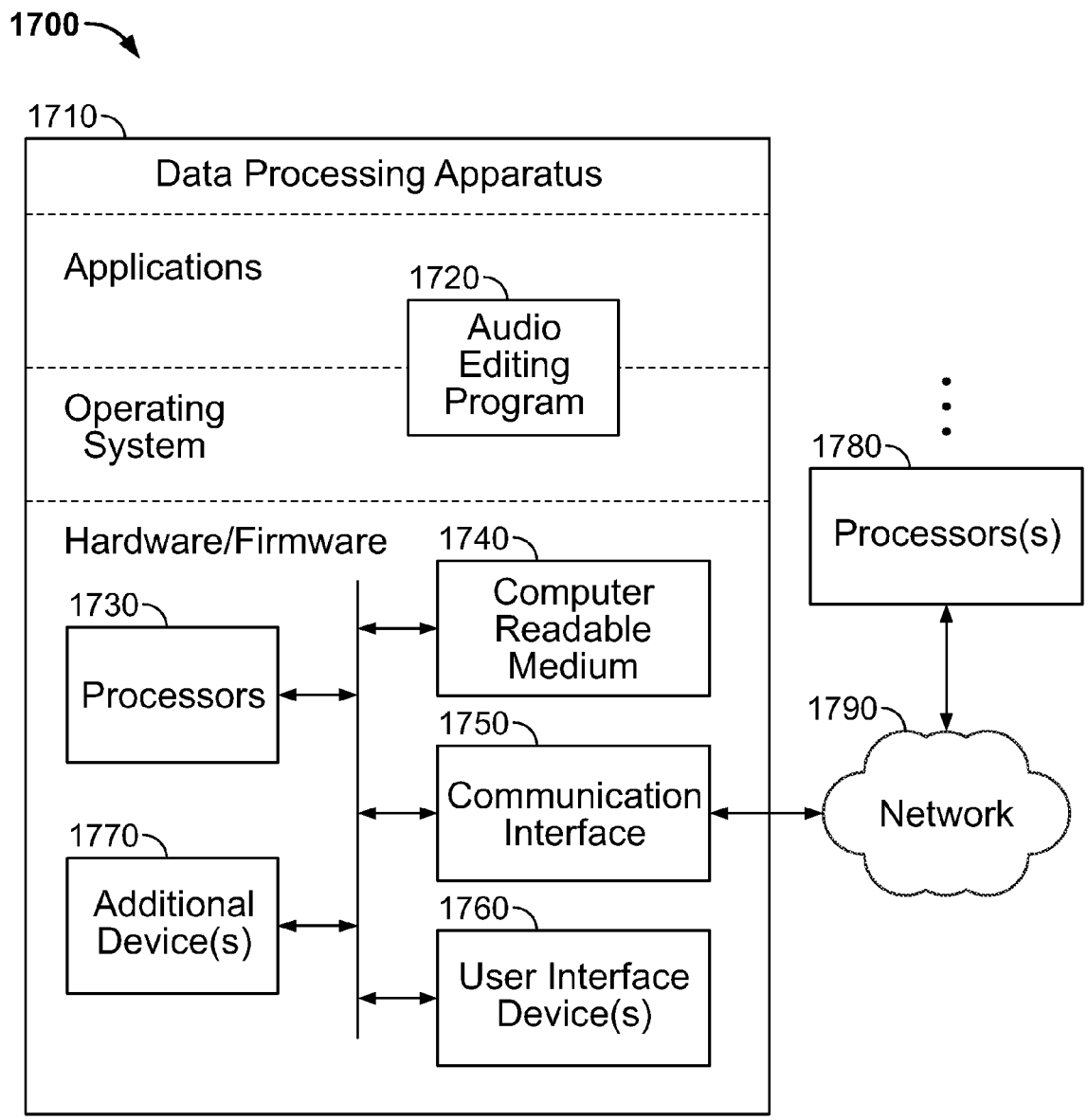
FIG. 17 shows a block diagram of an example system for editing audio assets.

FIG. 17 shows a block diagram of an example system for editing audio assets. A data processing apparatus 1710 can include hardware/firmware, an operating system and one or more computer programs, including audio editing program 1720. The audio editing program 1720 operates, in conjunction with the data processing apparatus 1710, to effect various operations described in this specification. Thus, the program 1720, in combination with processor(s) and computer-readable media (e.g., memory), represents one or more structural components in the system.

The audio editing program 1720 can be an audio processing application (e.g., an audio editing or digital signal processing application), or a portion thereof. As used here, an application is a computer program that the user perceives as a distinct computer tool used for a defined purpose. An application can be built entirely into the operating system (OS) of the data processing apparatus 1710, or an application can have different components located in different locations (e.g., one portion in the OS or kernel mode, one portion in the user mode, and one portion in a remote server), and an application can be built on a runtime library serving as a software platform of the apparatus 1710. Moreover, an application can be a graphical user interface application (e.g., a Web browser) that connects to one or more processors 1780 (e.g., one or more Web servers) over a network 1790 and provides the computer tool as a network service.

The data processing apparatus 1710 includes one or more processors 1730 and at least one computer-readable medium 1740 (e.g., random access memory, storage device, etc.). The data processing apparatus 1710 can also include a communication interface 1750, one or more user interface devices 1760, and one or more additional devices 1770. The user interface device(s) 1760 can include display screen(s), keyboard(s) (e.g., a custom video editing keyboard), mouse, stylus, or any combination thereof. Moreover, the data processing apparatus 1710 can itself be considered a user interface device (e.g., when the audio editing program 1720 is delivered as a Web service).

The additional device(s) 1770 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Once programmed, the data processing apparatus 1710 is operable to identify audio data and apply an inverse audio effect to other audio data. In this process, a spectral print of audio data for a particular track can be identified and an inverse spectral print can be automatically applied to one or more other tracks.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving digital audio data incorporated in a plurality of audio tracks, each audio track being a distinct audio file including one or more channels;
   displaying an audio editing interface including a visual representation of audio data for each of multiple tracks of the plurality of audio tracks;
   receiving a selection of one or more audio tracks of the plurality of audio tracks for editing, the selected audio tracks being fewer than all of the plurality of audio tracks;
   receiving, using the audio editing interface, an input specifying an audio effect to apply to the selected audio tracks;
   automatically applying an inverse of the audio effect to one or more non-selected audio tracks in response to the input without applying the audio effect to the selected audio tracks; and
   updating the visual representations for the audio data of the one or more non-selected audio tracks in response to the applied inverse of the audio effect.

2. The method of claim 1, where the input specifying an audio effect further comprises:
   receiving an input selecting one or more frequencies of the audio track.

3. The method of claim 2, where the selected audio effect is an amplitude increase to be applied to the selected one or more frequencies and applying the inverse of the audio effect includes applying a corresponding amplitude decrease to the selected one or more frequencies of each non-selected audio track, where the corresponding amplitude decrease is a multiplier of the amplitude increase.

4. The method of claim 1, where the selected audio effect is an amplitude increase and applying the inverse of the audio effect included applying a corresponding amplitude decrease to each non-selected audio track.

5. The method of claim 1, further comprising:
   identifying a time range for the identified audio effect, the time range being less than the length of the selected audio tracks.

6. The method of claim 1, further comprising:
   identifying one or more of the audio tracks as protected tracks, where the inverse of the audio effect is not applied to protected tracks.

7. The method of claim 1, where the inverse of the audio effect is an equal and opposite magnitude of the identified audio effect.

8. The method of claim 1, where the inverse of the audio effect has a magnitude that is a multiplier of the identified audio effect.

9. A computer program product, encoded on a machine-readable storage device or substrate, operable to cause data processing apparatus to perform operations comprising:
   receiving digital audio data incorporated in a plurality of audio tracks, each audio track being a distinct audio file including one or more channels;
   displaying an audio editing interface including a visual representation of audio data for each of multiple tracks of the plurality of audio tracks;
   receiving a selection of one or more audio tracks of the plurality of audio tracks for editing, the selected audio tracks being fewer than all of the plurality of audio tracks;
   receiving, using the audio editing interface, an input specifying an audio effect to apply to the selected audio tracks;

automatically applying an inverse of the audio effect to one or more non-selected audio tracks in response to the input without applying the audio effect to the selected audio tracks; and updating the visual representations for the audio data of the one or more non-selected audio tracks in response to the applied inverse of the audio effect.

10. The computer program product of claim 9, where the input specifying an audio effect further comprises:
receiving an input selecting one or more frequencies of the audio track.

11. The computer program product of claim 10, where the selected audio effect is an amplitude increase to be applied to the selected one or more frequencies and applying the inverse of the audio effect includes applying a corresponding amplitude decrease to the selected one or more frequencies of each non-selected audio track, where the corresponding amplitude decrease is a multiplier of the amplitude increase.

12. The computer program product of claim 9, where the selected audio effect is an amplitude increase and applying the inverse of the audio effect included applying a corresponding amplitude decrease to each non-selected audio track.

13. The computer program product of claim 9, further comprising:
identifying a time range for the identified audio effect.

14. The computer program product of claim 9, further comprising:
identifying one or more of the audio tracks as protected tracks, where the inverse of the audio effect is not applied to protected tracks.

15. The computer program product of claim 9, where the inverse of the audio effect is an equal and opposite magnitude of the identified audio effect.

16. The computer program product of claim 9, where the inverse of the audio effect has a magnitude that is a multiplier of the identified audio effect.

17. A system comprising:
a user input device, a display, a memory device, and a processor programmed to perform operations including:
receiving digital audio data incorporated in a plurality of audio tracks, each audio track being a distinct audio file including one or more channels;
displaying an audio editing interface including a visual representation of audio data for each of multiple tracks of the plurality of audio tracks;
receiving a selection of one or more audio tracks of the plurality of audio tracks for editing, the selected audio tracks being fewer than all of the plurality of audio tracks;
receiving, using the audio editing interface, an input specifying an audio effect to apply to the selected audio tracks;
automatically applying an inverse of the audio effect to one or more non-selected audio tracks in response to the input without applying the audio effect to the selected audio tracks; and
updating the visual representations for the audio data of the one or more non-selected audio tracks in response to the applied inverse of the audio effect.

18. The system of claim 17, where the input specifying an audio effect further comprises:
receiving an input selecting one or more frequencies of the audio track.

19. The system of claim 18, where the selected audio effect is an amplitude increase to be applied to the selected one or more frequencies and applying the inverse of the audio effect includes applying a corresponding amplitude decrease to the selected one or more frequencies of each non-selected audio track, where the corresponding amplitude decrease is a multiplier of the amplitude increase.

20. The system of claim 17, where the selected audio effect is an amplitude increase and applying the inverse of the audio effect included applying a corresponding amplitude decrease to each non-selected audio track.

21. The system of claim 17, where the operations further include:
identifying a time range for the identified audio effect.

22. The system of claim 17, where the operations further include:
identifying one or more of the audio tracks as protected tracks, where the inverse of the audio effect is not applied to protected tracks.

23. The system of claim 17, where the inverse of the audio effect is an equal and opposite magnitude of the identified audio effect.

24. The system of claim 17, where the inverse of the audio effect has a magnitude that is a multiplier of the identified audio effect.

* * * * *